(12) United States Patent
Steidl et al.

(10) Patent No.: US 10,711,863 B2
(45) Date of Patent: Jul. 14, 2020

(54) TORSIONAL VIBRATION DAMPER

(71) Applicant: Hasse & Wrede GmbH, Berlin (DE)

(72) Inventors: Michael Steidl, Berlin (DE); Florian Knopf, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 0 days.

(21) Appl. No.: 16/257,147

(22) Filed: Jan. 25, 2019

(65) Prior Publication Data

US 2019/0170213 A1 Jun. 6, 2019

Related U.S. Application Data

(63) Continuation of application No. PCT/EP2017/068530, filed on Jul. 21, 2017.

(30) Foreign Application Priority Data

Jul. 26, 2016 (DE) .......................... 10 2016 113 719

(51) Int. Cl.
*F16F 15/14* (2006.01)
*F16F 15/167* (2006.01)

(52) U.S. Cl.
CPC ........ *F16F 15/167* (2013.01); *F16F 15/1442* (2013.01)

(58) Field of Classification Search
CPC ...... F16F 15/165; F16F 15/167; F16F 15/137; F16F 15/16; F16F 15/1442
See application file for complete search history.

(56) References Cited

U.S. PATENT DOCUMENTS

| 3,823,619 | A | * | 7/1974 | Shotwell | ................. F16F 15/16 74/573.12 |
| T973,005 | I4 | * | 8/1978 | Shyu | ........................ F16F 9/12 74/573.12 |
| 4,208,928 | A | | 6/1980 | Conseur et al. | |
| 4,615,237 | A | | 10/1986 | Forkel | |

(Continued)

FOREIGN PATENT DOCUMENTS

| CN | 203362998 U | 12/2013 |
| DE | 748 416 A | 11/1944 |

(Continued)

OTHER PUBLICATIONS

"Silicone Rubber," Wikipedia Page dated by Wayback Machine to Apr. 13, 2014, url: <https://web.archive.org/web/20140413142953/https://en.wikipedia.org/wiki/Silicone_rubber>.*

(Continued)

*Primary Examiner* — Richard W Ridley
*Assistant Examiner* — Brian J McGovern
(74) *Attorney, Agent, or Firm* — Crowell & Moring LLP

(57) ABSTRACT

A torsional vibration damper has a hub part primary mass mountable on a motor drive shaft, and an interia ring secondary mass which at least partially encloses the hub part in the radially outer region. A gap between the hub part and the inertia ring is filled with fluid. A seal device between the hub part and the flywheel ring prevents escape of the fluid. The seal device has a first ring connected tightly to the hub part, a second ring connected tightly to the inertia ring, and an elastomer ring connected on one side sealingly to the first ring and on the other side to the second ring.

6 Claims, 4 Drawing Sheets

(56) References Cited

U.S. PATENT DOCUMENTS

| | | | |
|---|---|---|---|
| 4,825,718 | A | 5/1989 | Seifert et al. |
| 5,139,120 | A | 8/1992 | Gomi |
| 5,140,868 | A | 8/1992 | Mizuno et al. |
| 2007/0249442 | A1 | 10/2007 | Grunau et al. |

FOREIGN PATENT DOCUMENTS

| | | | |
|---|---|---|---|
| DE | 31 51 914 A1 | | 6/1983 |
| DE | 37 16 441 C1 | | 4/1988 |
| DE | 41 10 845 A1 | | 10/1991 |
| DE | 196 43 687 A1 | | 4/1998 |
| DE | 10 2006 016 202 B3 | | 7/2007 |
| DE | 10 2011 122 034 A1 | | 6/2013 |
| EP | 2 607 744 A2 | | 6/2013 |
| GB | 1105292 A | | 3/1968 |
| JP | 49-73580 A | | 7/1974 |
| JP | 2-195043 A | | 8/1990 |
| JP | 3-57541 U | | 6/1991 |
| JP | 5-44781 A | | 2/1993 |
| JP | 7-317841 A | | 12/1995 |
| JP | 2011-27128 A | | 2/2011 |

OTHER PUBLICATIONS

International Search Report (PCT/ISA/210) issued in PCT Application No. PCT/EP2017/068530 dated Nov. 3, 2017 with English translation (four (4) pages).
German-language Written Opinion (PCT/ISA/237) issued in PCT Application No. PCT/EP2017/068530 dated Nov. 3, 2017 (five (5) pages).
German-language Office Action issued in counterpart German Application No. 102016113719.7 dated Mar. 8, 2017 (seven (7) pages).
Chinese-language Office Action issued in Chinese Application No. 201780046140.4 dated Feb. 3, 2020 with English translation (eight (8) pages).
Japanese-language Office Action issued in counterpart Japanese Application No. 2019-504070 dated Dec. 19, 2019 with English translation (11 pages).

* cited by examiner

TORSIONAL VIBRATION DAMPER

CROSS REFERENCE TO RELATED APPLICATIONS

This application is a continuation of PCT International Application No. PCT/EP2017/068530, filed Jul. 21, 2017, which claims priority under 35 U.S.C. § 119 from German Patent Application No. 10 2016 113 719.7, filed Jul. 26, 2016, the entire disclosures of which are herein expressly incorporated by reference.

BACKGROUND AND SUMMARY OF THE INVENTION

The present invention concerns a torsional vibration damper having a hub part (primary mass) which may be attached to a drive shaft of a motor, and an inertia ring (secondary mass) which encloses the hub part in the radially outer region, wherein a fluid-filled gap and a sealing device to prevent the escape of fluid are provided between the hub part and the inertia ring.

A torsional vibration damper of the generic type is known for example from GB 11 05 292 A.

In general, the torsional vibration dampers discussed here have an outwardly offset inertia ring, in contrast to the also known design in which the inertia ring is mounted fully encapsulated in a separate housing.

The disadvantage of the latter design is that the housing mass is irrelevant to the function of the damper and the heat dissipation is limited by the encapsulation of the inertia ring.

In the known torsional vibration dampers with outwardly offset inertia ring, it must be ensured that the escape of fluid present between the hub part and the inertia ring is avoided.

In the torsional vibration damper of the generic type, sliding sealing rings are used as seals, which has the disadvantage that a fluid, in particular silicon oil, is used as a damping medium but has no lubricating properties, so sliding seals are of limited suitability for solving the sealing problem since they suffer from high wear within a very short time. Furthermore, sliding seals do not guarantee complete protection against penetration of very small particles and e.g. water.

The present invention is based on the object of providing a torsional vibration damper of the generic type with sealing devices which do not have the above-mentioned disadvantages and which have a long service life.

This object is achieved in that the sealing devices each have a first ring tightly connected to the hub part and a second ring tightly connected to the inertia ring, and an elastomer ring which is connected sealingly on one side to the first ring and on the other side to the second ring.

Such a design avoids the disadvantages of the prior art since no friction can occur between the sealing elements and the rotating parts of the torsional vibration damper.

The first and second rings of the sealing devices which are sealingly connected to the hub part and to the inertia ring respectively are preferably made of metal.

Preferably, the respective elastomer ring of a sealing device is connected sealingly, by means of a rubber-metal connection produced during an elastomer cross-linking process, to the metal rings which are attached respectively to the hub part and to the inertia ring.

Preferably, as an elastomer between the respective first and second rings of a sealing device, a high-temperature-resistant elastomer is used such as e.g. EPDM or silicone material. The term "silicone material" in the context of this publication means a material which contains or is a synthetic polymer in which silicon atoms are linked via oxygen atoms.

This is particularly useful since said materials are also suitable for use in high temperatures.

The respective sealing devices are not by design sliding seals, so that a secure and permanent complete seal is achieved.

The sealing devices need not be pressed in, giving the advantage that the sealing devices may be fitted stress-free. Thus a defined state of the gap in the torsional vibration damper may be guaranteed, in particular if the inertia ring is mounted on plain bearings relative to the hub part.

It is possible that the at least one elastomer ring, preferably made of silicone material, is connected sealingly to superficial regions of the first and second rings which extend obliquely and/or axially and/or radially. "Obliquely" means at an angle relative to the axial direction and radial direction.

It is particularly advantageous if the at least one elastomer ring, preferably made of silicone material, is connected sealingly to differently oriented, in particular axially and radially extending, superficial regions of the one or two metal rings. Such a sealing connection in two directions on the primary mass and/or the secondary mass forms a particularly secure and durable connection. This may also guarantee a particularly well-defined state of the gap in permanent use.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
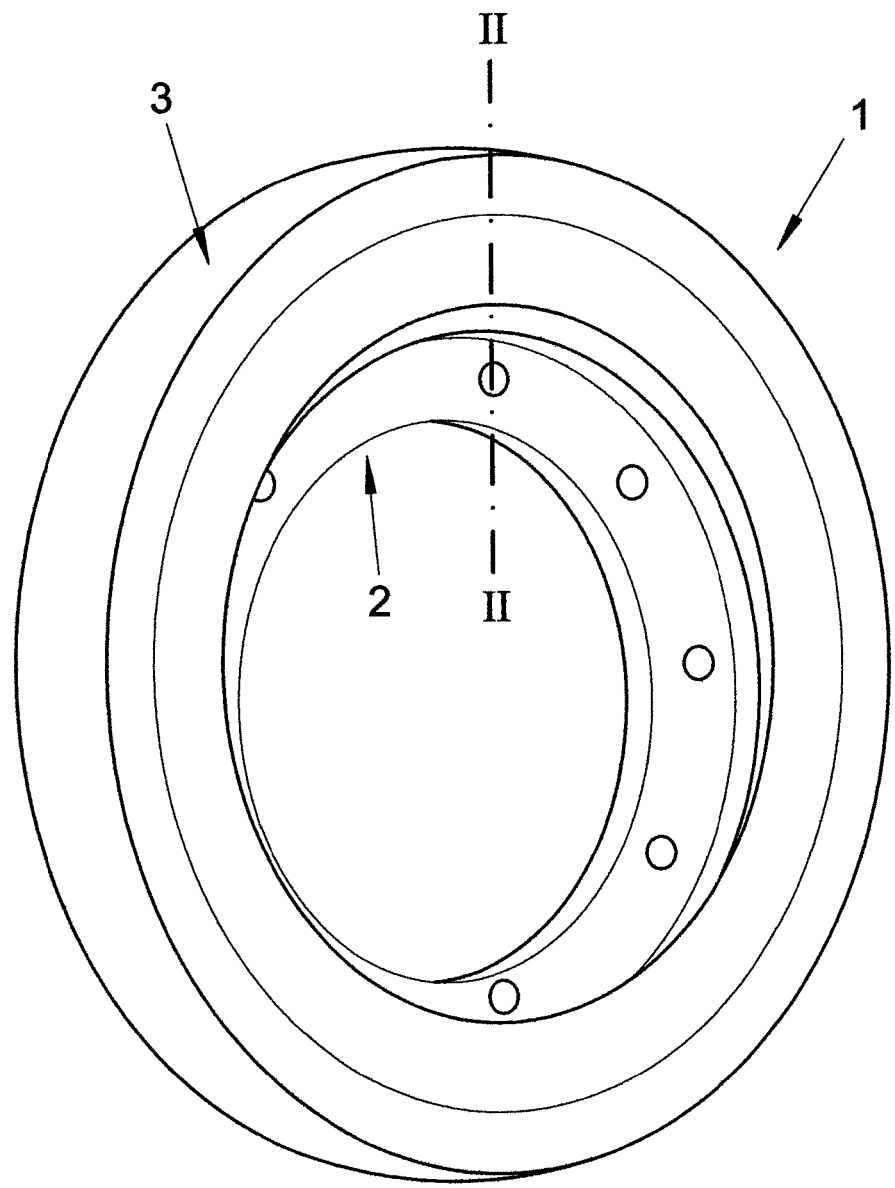
FIG. 1 a perspective depiction of a torsional vibration damper according to an embodiment of the present invention.
Figure 2:
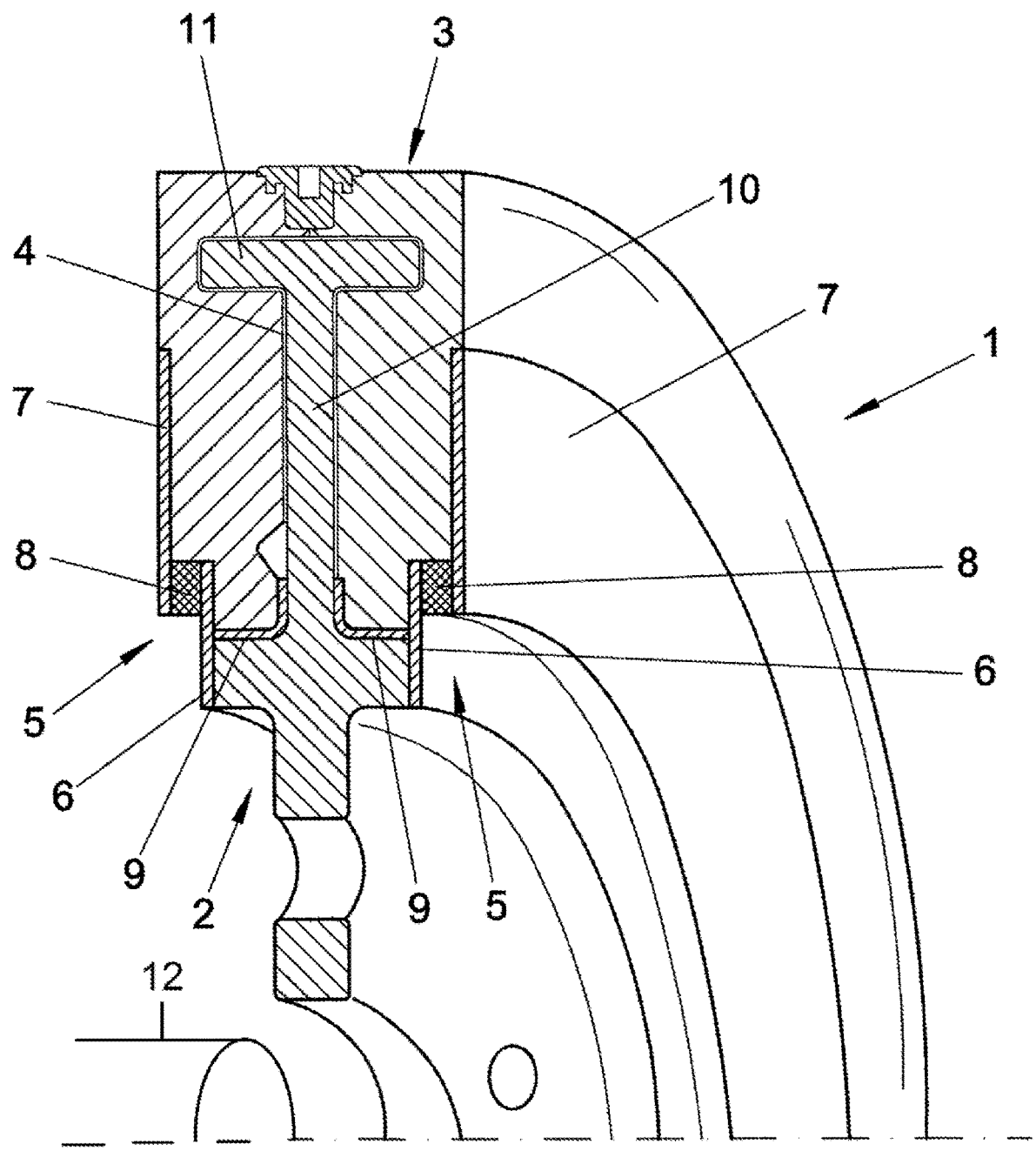
FIG. 2 a partial section along line II-II in FIG. 1.

The torsional vibration damper, shown in FIGS. 1 and 2 and designated as a whole with reference sign 1, has a hub part 2 which may be attached to a drive shaft 12 of a motor and is designated the primary mass, and an inertia ring 3 enclosing the hub part 2 in the radially outer region and designated the secondary mass.

A gap 4 is provided between the hub part 2 and the inertia ring 3 and is filled with a fluid, preferably a silicone oil. Towards the outside, the region of the gap 4 is sealed by sealing devices 5 which are described in more detail below.

Each sealing device 5 consists of a first ring 6 tightly connected to the hub part 2, and a second ring 7 itself tightly connected to the inertia ring 3, and an elastomer ring 8 which is connected sealingly on one side to the first ring 6 and on the other side to the second ring 7.

The respective first and second rings 6, 7 of the respective sealing device 5 preferably consist of metal and are fixedly connected to the hub part 2 or the inertia ring 3 respectively by a suitable connection method, in particular by screwing, welding, gluing, soldering or similar, and hence in the sense of this publication are sealingly connected, in particular sealingly connected all round.

The respective elastomer ring 8, preferably made of high-temperature-resistant elastomer e.g. silicone material, is sealingly connected to both the first and second rings 6, 7 in the manner of a composite component, in particular sealingly connected all round. Preferably, the respective elastomer ring of the respective sealing device is sealingly connected, by a rubber-metal connection created in particular during an elastomer cross-linking process, to the metal ring which is attached to the hub part or to the inertia ring.

This gives a perfect and permanent seal of the gap region, wherein the use of high-temperature-resistant elastomers, e.g. silicone material, for the respective rings 8 gives the advantage that these are also suitable for use in high temperatures.

The inertia ring 3 is preferably mounted on plain bearings 9, both radially and axially relative to the hub part 2, whereby the size of the gap 4 is precisely defined.

It is particularly advantageous if the elastomer ring 8, preferably made of silicon, is vulcanized onto mutually opposing axial and/or radial surfaces of the first and second rings 6, 7.

In the embodiment of the invention shown in FIG. 1 and FIG. 2, the elastomer ring 8, preferably made of silicon, is vulcanized onto mutually opposing surfaces of the first and second rings 6, 7 which here overlap each other in the radial direction.

Figure 3:
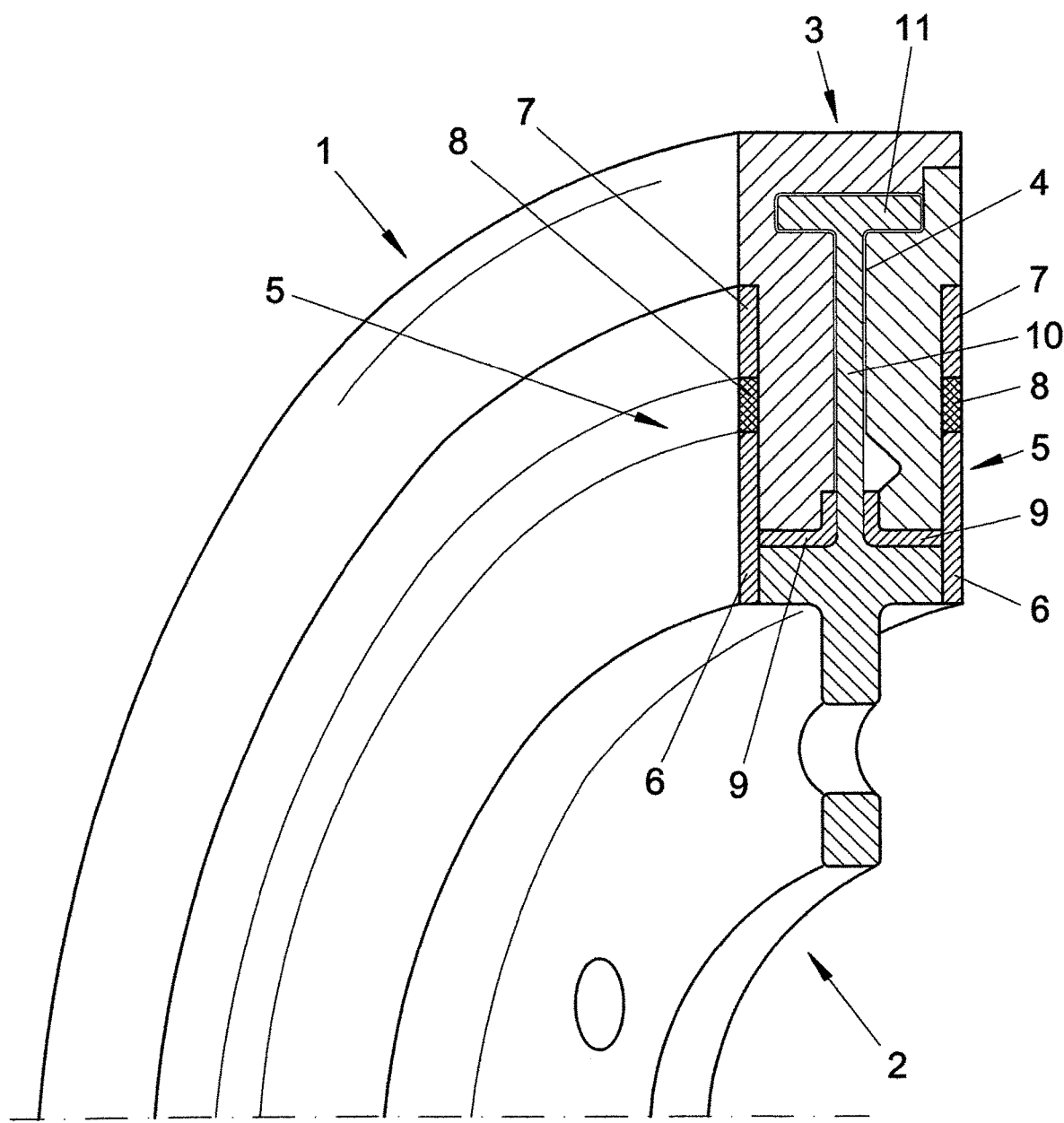
FIG. 3 a partial section corresponding to FIG. 2 through a torsional vibration damper according to a further embodiment of the invention.

In the embodiment of the invention shown in FIG. 3, the difference from the exemplary embodiment in FIGS. 1 and 2 is that the first and second rings 6, 7 of the sealing devices 5 lie in one plane, and the ring 8 is vulcanized onto mutually opposing, peripheral, axial edges of these rings 6 and 7.

Figure 4:
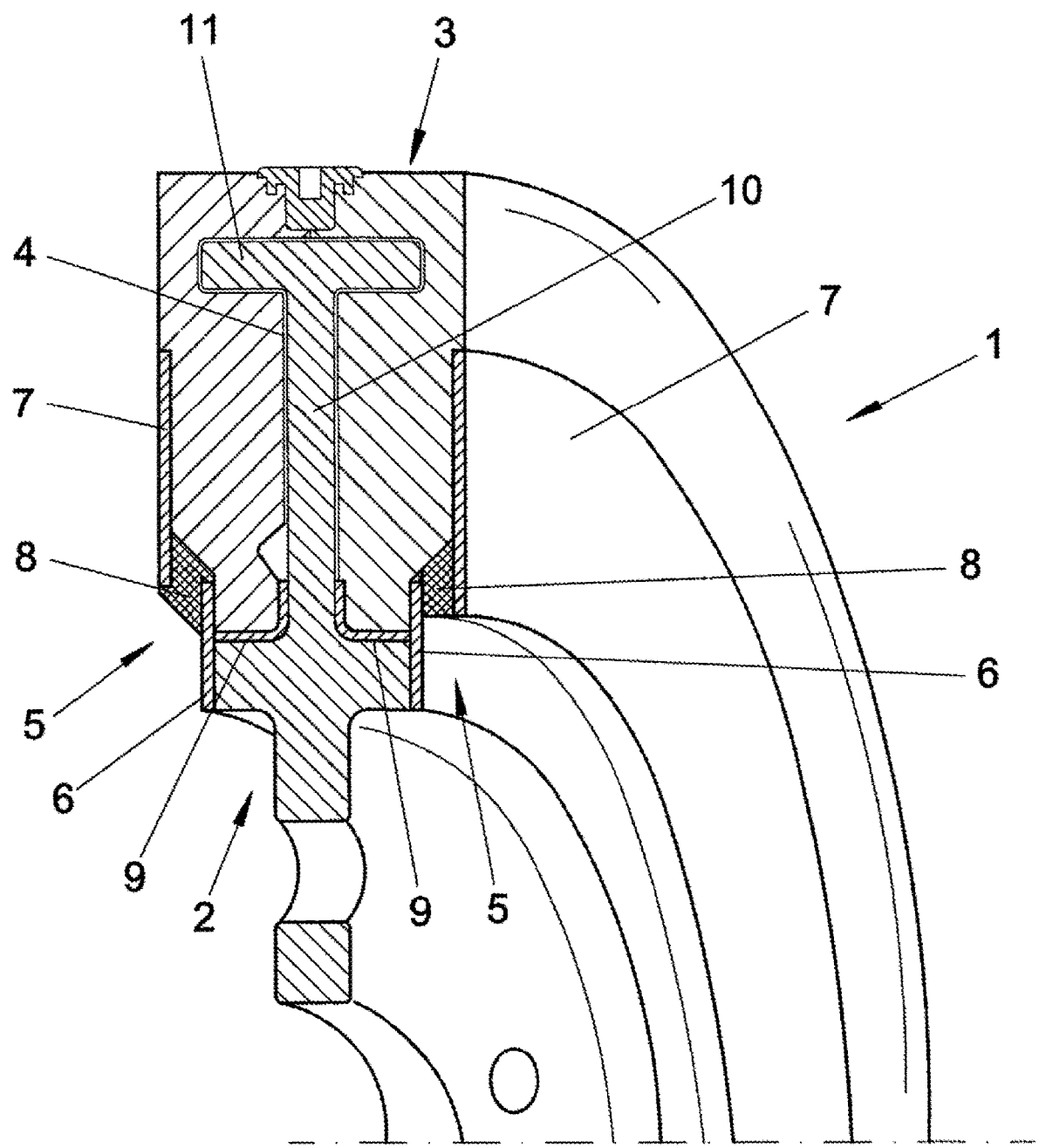
FIG. 4 a torsional vibration damper in accordance with another embodiment of the present invention.

Designs are also conceivable in which the elastomer ring is simultaneously attached to or adheres to radial surfaces preferably of larger area, and also to axial surfaces, in particular edge regions, of the rings 6 and 7. It is to this extent particularly advantageous if the elastomer ring 8, preferably made of silicon, is vulcanized onto mutually opposing axial and radial surfaces of the first and second rings 6, 7. This can be achieved in various ways. For example, it may be advantageous that, in a design of the type shown in FIG. 2, the ring 6 extends radially outwardly slightly less far (as shown at the right side of FIG. 4), and if the elastomer material then also reaches to its radially outer axial side where it also adheres, and if the elastomer material of the ring 8 also reaches to the lower axial side of the ring 7 where it adheres (not shown here). The ring 8 as a whole could also run obliquely to the radial and axial directions, for example if the ring 7 were to reach radially inwardly slightly less far, or if the two rings 6, 7 did not overlap radially. Nonetheless, obliquely running rings 8 which adhere to the axial sides and radial sides of the rings 6, 7 (as shown at the left side of FIG. 4) could again achieve an advantageous embodiment.

It should be mentioned that the inertia ring 3 here consists of at least two components so that this inertia ring 3 can be mounted on the hub part 2. Here, all previously known design forms are conceivable.

In the embodiments shown, the hub part 2 has a radially outwardly protruding flange 10 which, in the outer edge region, is terminated by a web 11 which runs in the axial direction and which, as shown in FIGS. 2 and 3, may extend to both sides of the flange 10 giving a T-shape, but may also run only towards one side of the flange 10 so that an L-shaped cross section results. This geometry fixes the inertia ring 3 both in the radial direction and in the axial direction relative to the hub part 2, wherein—as already stated—the plain bearings 9 always define the size of the peripheral gap 4. This design is particularly advantageous but the invention is not restricted thereto.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Torsional vibration damper
2 Hub part
3 Inertia ring
4 Gap
5 Sealing device
6 Ring
7 Ring
8 Ring
9 Plain bearing
10 Flange
11 Web

What is claimed is:

1. A torsional vibration damper, comprising:
a hub part configured to be attached to a shaft;
an inertia ring which at least partially encloses a radially outer region of the hub part; and
a sealing device configured to prevent escape of a fluid provided in a fluid-filled gap between the hub part and the inertia ring, the sealing device including a first ring connected to the hub part, a second ring connected to the inertia ring, and an elastomer ring connected sealingly on a first side to the first ring and on a second side to the second ring,
wherein
the first and second rings are made of metal,
the first and second rings do not overlap radially, and
the elastomer ring is connected sealingly and extends obliquely to axial and radial surfaces of each of the first and second rings relative to a rotation axis of the torsional vibration damper.

2. The torsional vibration damper as claimed in claim 1, wherein
the elastomer ring is connected sealingly to the first and second rings by a rubber-metal connection.

3. The torsional vibration damper as claimed in claim 2, wherein
the rubber-metal connection is a result of an elastomer vulcanization process.

4. The torsional vibration damper as claimed in claim 1, wherein
the elastomer ring is a silicone-containing elastomer.

5. The torsional vibration damper as claimed in claim 1, wherein
the first and second rings are arranged in a common plane, and
the elastomer ring is connected sealingly to mutually facing peripheral edges of the first and second rings.

6. The torsional vibration damper as claimed in claim 1, wherein
the inertia ring is mounted on at least one plain bearing configured to maintain the inertia ring apart from the hub part and one or both of a predetermined radial distance and a predetermined axial distance.

* * * * *